Sept. 13, 1938.    C. WHITE    2,130,053

INSERT VALVE SEAT FOR SLUSH PUMPS

Filed Nov. 2, 1935

INVENTOR:
CLARENCE WHITE.,
BY
ATTORNEY.

Patented Sept. 13, 1938

2,130,053

UNITED STATES PATENT OFFICE 2,130,053

INSERT VALVE SEAT FOR SLUSH PUMPS

Clarence White, Walnut Park, Calif., assignor to Oil Well Manufacturing Corporation, Los Angeles, Calif., a corporation of California Application November 2, 1935, Serial No. 48,000

5 Claims. (Cl. 251—144)

My invention relates to valve seats of the removable insert type adapted for slush pumps such as are used in the oil industry.

In drilling oil wells by the rotary method it is customary to continuously supply rotary mud under pressure to the rotating body through the drill pipe. A slush pump is utilized for developing this high pressure. The valves of a slush pump ordinarily comprise a stationary seat with a pressure-operated valve member adapted to seat thereon to form a fluid-tight fit when the pressure on one side of the valve becomes greater than on the other side thereof by a predetermined amount.

The mud used in rotary drilling operations contains large quantities of abrasive matter which quickly wears away the seating surfaces of the valve seat and the valve member, and for this reason the valve seats of slush pumps must be frequently removed for replacement.

It is well-known that the valve openings in the valve deck of slush pumps have a persistent tendency to warp during use and it is difficult and often impossible to insert a new valve seat into a warped bore and to obtain sufficient conformity of the seat with the bore to form a fluid-tight seal therebetween.

There are various types of commercial slush pump valves which will establish an adequate seal even though the valve seat is slightly warped, but if a fluid-tight seal is not established between the valve seat and the bore in the valve deck, efficient operation of the slush pump is destroyed. Therefore, the provision of such a fluid-tight seal between the valve seat and the bore is of primary importance.

Several types of slush pumps utilize valves having a lower guide stem which is slidable in an axially positioned guide ring carried by the valve seat. These guide rings are ordinarily connected integrally with the valve seat by a plurality of laterally extending webs.

I have found that valve seats of this type having webs extending entirely across the seats are incapable of conforming to a warped bore because the webs prevent the lateral flexing of the seat when it is attempted to drive the seat into the warped bore.

It is a primary object of my invention to provide a removable insert valve seat including means for connecting an axially positioned valve guide ring thereto in a manner permitting flexing of the valve seat in any radial plane so that when the seat is driven into a warped bore the body portion of the seat will conform thereto.

This object may be accomplished by one form of the invention which includes an annular valve body having a valve guide ring axially positioned within the body and a single web integrally connecting the ring to the body, the web extending exclusively on one side of the ring so that lateral flexing of the valve body in any radial plane is not prevented.

Other features and advantages will be apparent from the following part of the specification in connection with the accompanying drawing and the appended claims.

Figure 1:
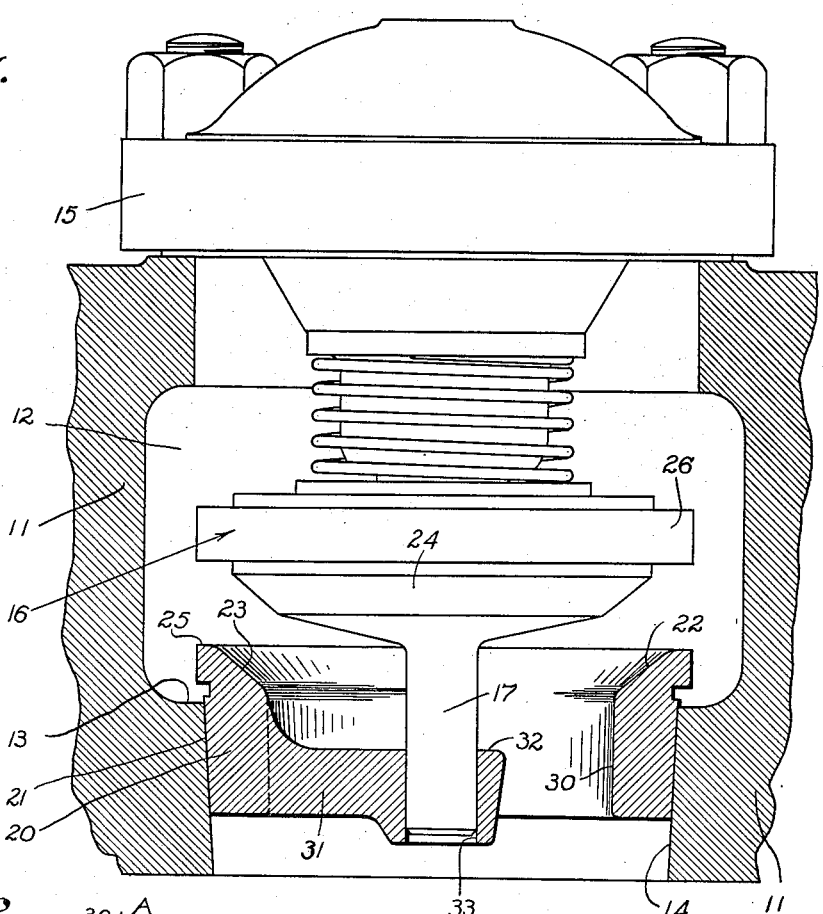
Fig. 1 is a fragmentary section through the valve chamber of a slush pump, illustrating the valve seat comprising my invention in a position of utility therein.

Referring generally to Fig. 1, the drawing shows walls 11 of a slush pump or the like, defining a valve chamber 12 and providing a valve deck 13 in which is formed a tapered bore or valve opening 14. The upper end of the valve chamber is closed by a head 15 which carries a movable valve structure 16. The type of valve which I prefer to illustrate in connection with my invention includes a downward extending axial guide stem 17.

Coming now to a description of the valve seat comprising my invention I show the valve seat as including an annular body 20, the outer peripheral wall 21 of which is tapered to conform to the taper of the bore 14, substantially in the manner shown. Formed on the upper peripheral rim of the seat 20 is a seating surface 22 which may be of any desired configuration. The seat 22 in this embodiment of my invention is shown as including an inner tapered portion 23 conforming to a tapered portion 24 on the valve structure 16 and an outer peripheral flat portion 25 which is adapted to be engaged by a flexible disc 26 included in the valve structure 16. It will be seen from Fig. 1 that the peripheral wall 21 of the body 20 is tapered inwardly in a direction away from the end face of the valve seat 22. This arrangement has the advantage that the action of the valve 16 in seating against said seat tends to force the same more tightly into the tapered bore 14 and a tight fit is thus continuously assured.

Figure 2:
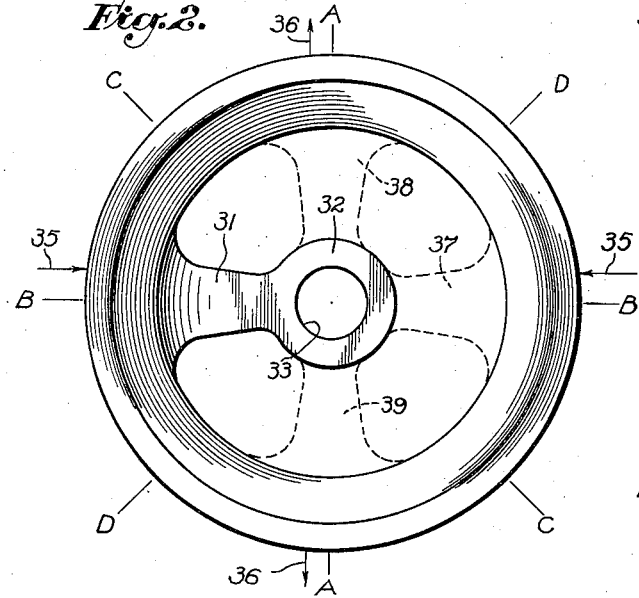
Fig. 2 is a top plan view of my novel insert valve seat.

Extending from the inner wall 30 of the seat body 20 toward the axis thereof is an integral web 31 terminating in an enlarged portion 32 in which is provided a cylindrical opening 33 for the reception of the guide stem 17. It will be seen that the valve guide ring formed by the enlarged portion 32 of the web is positioned coaxially with the annular body 20 and that the supporting web 31 extends exclusively on one side of the guide ring. The provision of this single web on only one side of the guide ring permits flexing or distortion of the annular body 20 in any radial plane. In other words, the annular body 20 by this construction retains sufficient resiliency to allow the body to be either compressed or stretched in any of the radial planes designated by the lines A, B, C, or D. For instance, if the bore 14 in the valve deck is warped so that when the valve seat is driven thereinto the body 20 is compressed in the plane B, as indicated by the arrows 35 of Fig. 2, a resilient stretch or elongation of the seat in the plane A, as indicated by the arrows 36, may occur so that the seat will conform substantially to the warped bore.

It will be seen that if one or more additional webs, such as are indicated by dotted lines 37, 38, and 39, were provided to support the guide ring 32, the valve seat would be incapable of the above-described flexing to conform to a warped bore.

Another important feature of my invention resulting from the use of a single web extending exclusively on one side of the guide ring is the increased area of the fluid passage through the seat formed by the inner wall 30 of the annular body.

In the form of the invention shown the guide ring and web are shown a substantial distance below the seating surface 22. However, it should be understood that the vertical position of the guide ring and web relative to the valve body is not material, the primary feature of the invention being the positioning of the web 31 to extend exclusively on one side of the guide ring whereby a new and useful result in the art is obtained.

It should be understood that although I have illustrated my novel valve seat in connection with a slush pump valve structure, numerous other uses in connection with various devices are contemplated and that these uses should be anticipated in interpreting the following claims.

I claim as my invention:

1. A removable valve seat member comprising an annular body having a valve seating surface formed by one end face thereof and having its external surface tapered inwardly toward its opposite end face, said externally tapered surface being adapted to seat in a valve seat bore, a valve guide ring arranged coaxially with respect to said annular body, and a web integrally connecting said valve guide ring with said annular body, said web extending exclusively on one side of said valve guide ring in such manner that said annular body may be flexed in any radial direction to conform to a warped valve seat bore when driven into such bore.

2. In combination, a valve seat member comprising a substantially circular annular body, a guide ring arranged substantially concentric with respect to said annular body, and a single web connecting said guide ring to said body; and a movable valve member having a valve body and a guide stem, said guide stem being slidably received in said guide ring, the external surface of said annular body being tapered inwardly in a direction away from said valve body, said annular body having a valve seat formed on the end thereof adjacent said valve body, the cross-sectional area of said annular body being such as to permit radial deformation thereof to fit an out-of-round bore, said single web connection extending exclusively to one side of said guide ring and being proportioned so that it does not hinder the radial deformation of said annular body.

3. A valve seat member comprising a substantially circular annular externally tapered body having a large diameter end and a relatively small diameter end and being of such cross-sectional area that it can deform radially to conform to an out-of-round bore when said body is pressurably seated in such bore, the larger end of said tapered body having a valve seat formed on an upper side thereof, and a valve guide ring integrally connected with said annular body by a web extending exclusively on one side of said ring, said web being of such dimensions and so arranged and constructed as not to interfere with the radial deformation of said body.

4. A removable valve seat member comprising a substantially circular annular externally tapered body, said body being of such cross-sectional area that it can be deformed to seat in an out-of-round bore, a valve seat formed on an upper side of the large end of said tapered body, a valve guide ring, and means connecting said guide ring with said body and constructed and arranged so that it offers no resistance to radial deformation of said body.

5. A valve seat member comprising an annular body having a valve seat, including a beveled seat portion formed by one end face thereof, said annular body having its external periphery tapered inwardly in a direction toward the opposite end face thereof, a valve guide ring arranged coaxially with respect to said annular body, and means connecting said valve guide ring to said annular body, said annular body being distortable to fit an out-of-round bore and said means being constructed and arranged so that it offers no resistance to radial deformation of said body.

CLARENCE WHITE.